(12) United States Patent
Jonsson et al.

(10) Patent No.: US 8,356,113 B2
(45) Date of Patent: Jan. 15, 2013

(54) UPNP AV DEMUX

(75) Inventors: Karl S. Jonsson, Rancho Santa Margarita, CA (US); Stefan H. Andersen, Trabuco Canyon, CA (US)

(73) Assignee: Cisco Technology, Inc., San Jose, CA (US)

(*) Notice: Subject to any disclaimer, the term of this patent is extended or adjusted under 35 U.S.C. 154(b) by 252 days.

(21) Appl. No.: 12/411,217

(22) Filed: Mar. 25, 2009

(65) Prior Publication Data
US 2010/0250778 A1 Sep. 30, 2010

(51) Int. Cl.
*G06F 15/16* (2006.01)
(52) U.S. Cl. ......... 709/246; 709/203; 709/217; 709/248
(58) Field of Classification Search .......... 709/217, 709/203, 231, 246, 248
See application file for complete search history.

(56) References Cited

U.S. PATENT DOCUMENTS

| | | | |
|---|---|---|---|
| 6,594,699 B1* | 7/2003 | Sahai et al. ............ 709/228 |
| 7,310,628 B2* | 12/2007 | Sugimoto et al. .......... 1/1 |
| 7,647,549 B2* | 1/2010 | Denoual et al. .......... 715/200 |
| 7,680,804 B2* | 3/2010 | Upendran et al. ........ 707/999.1 |
| 7,779,064 B2* | 8/2010 | Phillips ................ 709/201 |
| 7,877,463 B2* | 1/2011 | Lentini et al. .......... 709/219 |
| 7,877,497 B2* | 1/2011 | Kirkland ............... 709/229 |
| 8,117,342 B2* | 2/2012 | Heredia et al. .......... 709/246 |
| 2003/0110234 A1* | 6/2003 | Egli et al. ............. 709/217 |
| 2004/0024812 A1* | 2/2004 | Park et al. ............. 709/203 |
| 2006/0140265 A1* | 6/2006 | Igler et al. .......... 375/240.01 |
| 2006/0274869 A1* | 12/2006 | Morse ................. 375/352 |
| 2007/0222779 A1* | 9/2007 | Fastert et al. ........... 345/418 |
| 2007/0274689 A1* | 11/2007 | Stone ................. 386/123 |
| 2007/0280361 A1* | 12/2007 | Kwon et al. ............ 375/259 |
| 2008/0129879 A1* | 6/2008 | Shao et al. ............. 348/723 |
| 2008/0288440 A1* | 11/2008 | Monni ................... 707/1 |
| 2010/0070608 A1* | 3/2010 | Hosur ................. 709/218 |

* cited by examiner

*Primary Examiner* — Kamal Divecha
(74) *Attorney, Agent, or Firm* — Haynes and Boone LLP

(57) ABSTRACT

In one embodiment, an apparatus includes a container containing media content such as a video file, one or more resources created from the media content such as audio and video components of the video file, and a content directory server (CDS) of an UPnP network to present the one or more resources to sink devices and to de-multiplex the audio component from the video file on demand and on the fly when the resources match a specified device description from a sink device.

20 Claims, 3 Drawing Sheets

UPNP AV DEMUX

TECHNICAL FIELD

The present disclosure relates generally to processing of audio and video data in a shared network and, in particular, to de-multiplexing of audio and video data in a Universal Plug and Play (UPnP) network.

BACKGROUND

UPnP provides universal connectivity and plug-and-play functionality in home and office networks. The UPnP architecture supports zero-configuration networking and automatic discovery of services. A device can dynamically join an UPnP network, obtain an internet protocol (IP) address, learn about the presence and capabilities of other devices, and obtain media content from other devices. For example, an audio sink device such as a MP3 player may browse and play music files stored and streamed from a source device over the network. Recently, however, there is a trend by music vendors of portable audio devices toward making music files available as music videos. This may leave an audio-only sink device unable to play music videos since video playback is not supported by the audio-only device.

A conventional solution to enable playing of a video file on an audio-only sink device is to add the capability to de-multiplex the audio component from the video file on the sink device. However, this may require extra hardware, software, or both on the sink device, increasing cost and reducing battery life, optimization of which are critical for a portable device. In addition, there is no intelligence to perform an on-demand audio de-multiplexing only when required, requiring user intervention to switch into and out of audio de-multiplexing, making the overall user experience less enjoyable.

BRIEF DESCRIPTION OF THE DRAWINGS

These figures are provided to assist in describing embodiments of the disclosure, and are not intended to be exclusive or limiting. In the figures, like reference numerals designate like elements.

DESCRIPTION

Overview

In one embodiment, an apparatus can include media files and a content directory server (CDS) configured to be operable with an UPnP network, where the CDS de-multiplexes the media file into one or more media format files and transmits the media format files to one or more devices that support the media format files.

In one embodiment, a method can include receiving a device description having one or more media format supported by a sink device from the sink device, searching for one or more media format files having media format matching the one or more media format supported by the sink device, presenting links to the one or more media format files found, de-multiplexing the one or more media format files on demand, and transmitting the one or more media format files to the sink device.

In one embodiment, a method can include receiving a media file to be added to a CDS of a network such as an UPnP network where the media file includes one or more components, analyzing protocol information of the media file to determine media format of the components, creating media format files for the components, and adding the created media format files and the media format of the components to the CDS.

DESCRIPTION OF EXAMPLE EMBODIMENTS

The UPnP architecture is a distributed, open networking architecture where sink devices access media content such as audio/video/picture/data files hosted on source devices. Embodiments of the present disclosure enable a source device to de-multiplex (separate) audio and video components from audio/video files presented in video containers. The source device may then provision the de-multiplexed audio or video components as independent files or resources to sink devices capable of supporting audio-only or video-only playback. Embodiments of the present disclosure also provide a source device with the intelligence to dynamically perform de-multiplexing of audio/video components on demand and on the fly. This intelligence allows the source device to present files or resources matching the rendering capabilities of a sink device as virtual links to the sink device.

Figure 1:
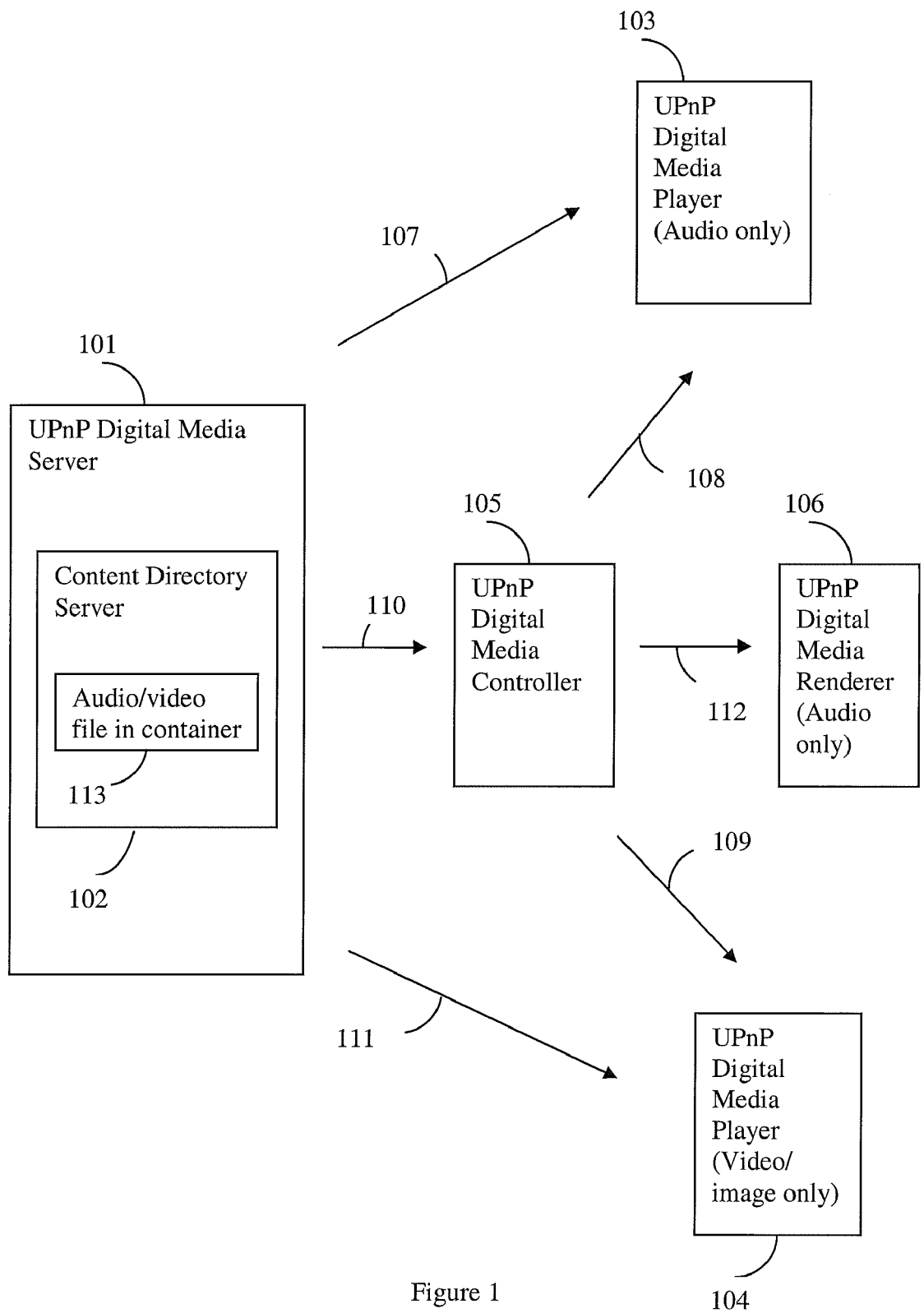
FIG. 1 illustrates an UPnP network showing an example implementation of a source device de-multiplexing of audio and video components from an audio/video container of video file for use by sink devices.

FIG. 1 illustrates an UPnP network implementing a source device de-multiplexing of audio and video components from an audio/video container of video file for use by sink devices in accordance with an example embodiment of the present disclosure. The UPnP network may include an UPnP digital media server (DMS) 101, UPnP digital media players (DMP) 103, 104, an UPnP digital media renderer (DMR) 106, and an UPnP digital media controller (DMC) 105. The DMS 101 acts as a source device to share or stream media content to client devices acting as sink devices on the network. For example, the DMS 101 may be a content server that stores and streams video/audio content over the network to the DMP 103, 104 and DMR 106. The DMP 103, 104 and DMR 106 are sink devices that render media contents for display or playback. For example, DMP 103 may be an audio-only sink device such as a MP3 player or a network stereo that receives de-multiplexed audio content 107 from the DMS 101.

Similarly, DMP 104 may be a video-only or image-only sink device such as a picture frame that receives de-multiplexed video or image content 111 from the DMS 101. DMR 106 may be another audio-only device, but in contrast to DMP 103, it is not capable of interfacing directly with the DMS 101. Instead, DMR 106 has to receive de-multiplexed audio content 112 through the DMC 105. The DMC 105 is a device that can auto-detect media servers on the network to set up connections between the DMS 101 and sink devices. For example, the DMC 105 may be an intelligent remote control that has the capability to find audio content 110 on the DMS 101 and to match it to the audio-only rendering capabilities of the DMR 106. In addition, the DMC 105 may also find and stream media content 108, 109 to match the rendering capabilities of DMP 103 and 104, respectively.

Media content of the DMS 101 may be managed by a content directory server (CDS) 102 running on the DMS 101. Media content is stored in containers which are data structures that encapsulate the media content for presentation to sink devices on the UPnP network as files or resources with specific media format. A sink device may only renders files with media format that it supports. When the CDS 102 presents media content to a sink device, it only presents media content with media format that matches the supported rendering capabilities of the sink device. These media format files may be presented to the sink devices and may be accessible by the sink devices through virtual links or physical links. The link to access the media format files may be virtual links because the media format files may not exist as separate physical files but are to be generated when the sink device requests them. For example, for an audio-only DMP 103 such as a MP3 player, the CDS 102 may present media format files as audio-only resources having MP3 encoding format to the MP3 player to match its MP3 playback capabilities. Such audio-only resources may be presented as virtual links because the audio-only resources do not physically exist as separate audio files but are generated on demand and on the fly when requested. Specifically, media content may be a music video file in AVI format. The music video may have an audio component encoded using the MP3 media format and a video component encoded using the DivX media format. The MP3 and the DivX media format files exist only as components of the AVI music video file and not as separate physical files. To the MP3 player, the CDS 102 may present the music video as a MP3 audio-only file carrying the title of the AVI music video. The MP3 player is not concerned with the existence of the MP3 file as only a component of the AVI music video file, nor is it concerned with how the MP3 file is to be de-multiplexed from the AVI music video file when the MP3 file is requested by the MP3 player. The MP3 file presented to the MP3 player exists as a virtual link with the virtual link pointing to the audio component of the AVI music video file. Thus, even though the music video is in AVI format, the MP3 player sees a virtual MP3 audio-only file available for playback. When the MP3 player selects the presented MP3 file for playback, the MP3 audio component is de-multiplexed on demand and on the fly from the AVI music video file. Alternatively, for audio-only resources that exist as separate physical files, the audio-only resources may be presented to the MP3 player as physical links with the physical links pointing to the physical audio files stored in containers.

Similarly, the CDS 102 may present video-only resources to match the video-only rendering capabilities of DMP 104. Such video-only resources may be presented to the DMP 104 as virtual links to media format files that do not exist as separate physical files, or as physical links to stored video files in containers. For example, using the same AVI music video example discussed earlier, if DMP 104 is able to render video file encoded in the DivX format, the CDS 102 may present the music video as a DivX video-only file carrying the title of the AVI music video to the DMP 104. The DivX file presented to the DMP 104 exists as a virtual link with the virtual link pointing to the video component of the AVI music video file. When the DMP 104 selects the presented DivX file for viewing, the DivX video component is de-multiplexed on demand and on the fly from the AVI music video file. Through virtual links, audio-only and video-only resources may be presented as different views of the same physical audio/video file in a container. Thus, to a sink device with full video and audio capabilities such as a television, the CDS 102 may present the audio/video resources as a physical link to the original audio/video file in container 113, as well as virtual links to the audio-only and video-only components of the audio/video file. When the sink device selects the audio-only or video-only resource for display or playback, the source device dynamically de-multiplexes the audio-only or the video-only component from the audio/video file in container 113 on the fly.

Figure 2:
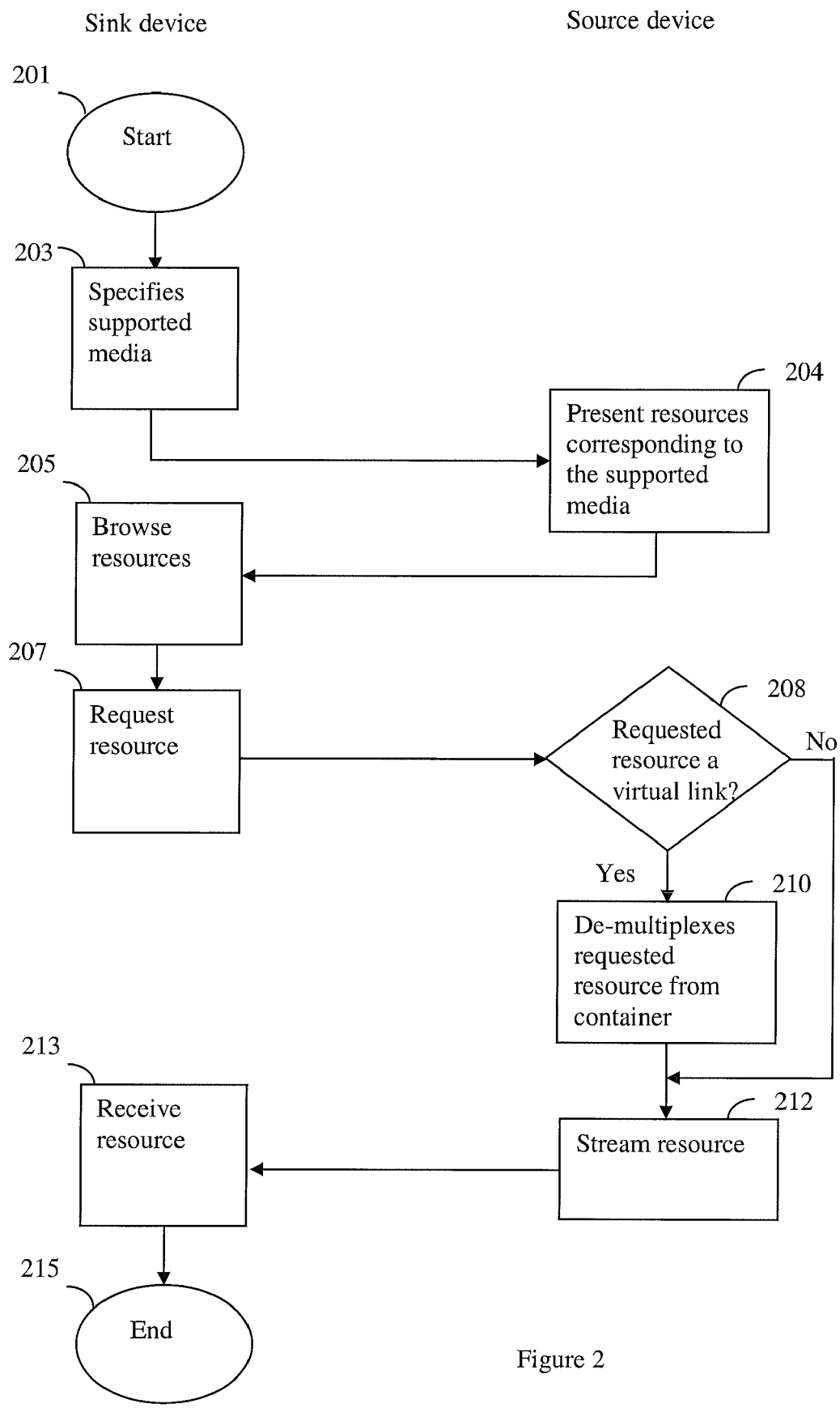
FIG. 2 illustrates an example interaction between a source device and a sink device for sink device playback of audio/video de-multiplexed resources.

FIG. 2 illustrates interactions between a source device and a sink device for source device audio/video de-multiplexing and for sink device playback of the de-multiplexed resources in accordance with an example embodiment of the present disclosure. For the source device to present resources matching the rendering capabilities of the sink device, the sink device may communicate its supported media format to the source device in step 203. For example, an audio player may specify in its transmitted device description to a DMS that it supports rendering of audio with the MP3, or AAC formats.

In step 204, the content directory server of the source device searches through its media content's header/protocol information which contains media format information of the media content to find media content supported by the sink device. The media content is presented to the sink device as resources or media format files. The resources may be presented as physical links to files with the supported format or presented as virtual links to files which need to be further de-multiplexed to generate files with the supported format. For example, for a MP3 audio player, the DMS may present physical links to resources that are standalone MP3 files or may present virtual links to MP3 audio files that have to be de-multiplexed from music video files in containers containing MP3 encoded audio components. Whether the resources are presented as physical links or as virtual links are of no concern to the MP3 audio player. The MP3 player sees only that the MP3 audio-only resources are available and any processing carried out by the content directory server of the source device to de-multiplex the file once the MP3 player selects the file for playback is transparent to the MP3 player. The de-multiplexing may be performed on demand and on the fly so that the media content in a single container may support multiple virtual resources to multiple sink devices.

In step 205, the sink device browses the presented resources from the source device. For example, a MP3 audio player may see MP3 standalone files or MP3 files that will be de-multiplexed from music video files containing audio component encoded in MP3 format. In step 207, the sink device may select a resource for playback and may communicate the selection to the source device. In step 208, the source device receives the selection from the sink device and checks to see if the selected resource is referenced by a virtual link and thus requiring further de-multiplexing, or referenced by a physical link. If the selected resource is referenced by a physical link, the source device reads the file and streams it to the sink device for playback in step 212. If the selected resource is referenced by a virtual link, in step 210 the source device reads the container containing the selected resource and performs de-multiplexing to generate the media format file with the supported format for streaming to the sink device. For example, if the selected resource is referenced by a virtual link to a MP3 audio file in a music video containing audio component encoded in MP3 format, the DMS de-multiplexes the MP3 file from the music video. The MP3 audio file is de-multiplexed from the music video on demand and on the fly for the MP3 audio player. In step 213, the sink device receives the selected resource in the supported format and renders it for playback.

On-demand source device generation of resources referenced by virtual links may also support applications other than audio and video de-multiplexing. One such application currently in use is for source device scaling of images for viewing by sink devices. An image may be stored on a source device in its original format. The source device may present virtual links to resources of the image in different formats to match the image viewing capabilities of the viewing sink device. For example, when using a PC monitor to view image files, the DMS may present virtual links to resources of the image in the various supported video resolution formats of the monitor. When a resource for a specific video resolution is selected, the DMS processes the image from the original format to generate the selected resolution on the fly for viewing by the PC monitor.

Source device generation of supported media files may also be used in other ways to enhance the rendering capabilities of sink devices. For example, a source device may synchronize the de-multiplexing and streaming of audio and video resources to a multitude of sink devices. For instance, the DMS may use audio synchronization standards such as IEEE 1588 to synchronize streaming of a music video to an audio/video player with de-multiplexing of the music audio to a separate speaker system. Similarly, the DMS may synchronize video de-multiplexing of a movie to a television set with audio de-multiplexing of the movie to a surround sound system.

Figure 3:
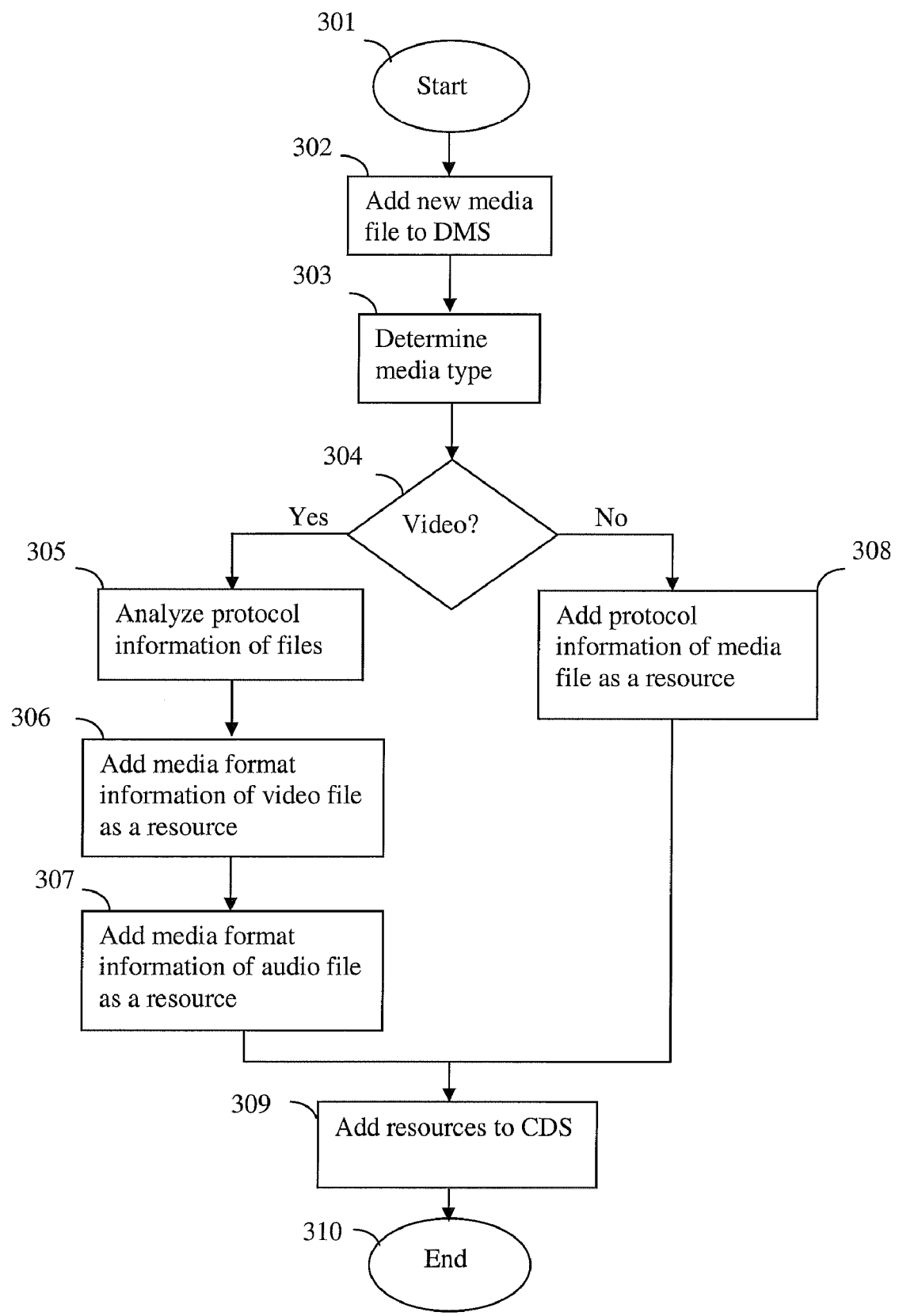
FIG. 3 shows an example method of creating resources when loading media content to a source device.

FIG. 3 shows a method of creating resources when loading media content to a source device in accordance with an example embodiment of the present disclosure. A media file or a folder containing media files is added to a source device such as a DMS in step 302. The media file or folder may contain audio, video, image, or data file. The DMS adds the media file by creating a container with a data structure to encapsulate the media file and by adding the media file as a resource to the container. In step 303, the DMS determines the media type of the added file to determine the type of additional resources or media format files to add. The DMS may determine the media type from information contained in the file, such as the file name extension, from the type of folder into which the media file has been placed, or from information supplied externally.

If the added file is a video file containing audio and video components files as determined in step 304, the DMS will add the header or protocol information of the video file to the container. The DMS will also analyze the header or protocol information of the video file to determine the types of audio and video codecs used and to find other information on the media format of the audio and video component files in step 305. For example, an added video file may be a music video with the video extension "AVI." The DMS will add the video file to a container. The DMS will also determine from the AVI extension that the file is a video file and may analyze its header or protocol information to determine that the audio component file is encoded in MP3 format and that the video component file is encoded in DivX format. In step 306, the DMS creates a resource for the video component file and adds the codec and other media format information of the video component file to the data structure of the container containing the original video file. Similarly, in step 307, the DMS creates a resource for the audio component file and adds the codec and other media format information of the audio component file to the container. If the added media file is not a video file as determined in step 304, the DMS may simply add the protocol information of the added file or of any component files as resources to the container in step 308.

In step 309, the DMS adds the created resources in the container to the CDS so that the resources may be presented to a sink device when the resources match the rendering capabilities of the sink device. The resources for the audio and video component files may be presented as virtual links into the container and may be de-multiplexed from the original video file on demand. Alternatively, the resource for the original media file may be presented as a physical link into the container. In the example of the AVI music video file with the MP3 encoded audio component file and the DivX encoded video component file, as mentioned, the DMS will create an audio resource with MP3 media format information and a video resource with DivX media format information for the audio and video component files of the music video, respectively. The DMS will add the resources for the music video, the MP3 audio component file, and the DivX video component file to the CDS. When an audio-only sink device specifies in its device description that its rendering capability supports MP3 audio decoding, the CDS will search for resources with MP3 media format information and present a virtual link to the MP3 audio component file of the music video as a resource to the sink device. Finally, if the sink device selects the virtual link, the DMS will de-multiplex the MP3 audio component file of the music video from the AVI video file and streams it to the sink device for playback.

It should be understood that the invention can be practiced with modification and alteration to the embodiments described without departing from the spirit and scope of the appended claims. The description is not intended to be exhaustive or to limit the invention to the precise embodiments disclosed. It should be further understood that the invention is limited only by the claims and the equivalents thereof.

What is claimed is:

1. An apparatus, comprising:
a non-transitory machine readable storage medium adapted to store a plurality of machine readable instruction which when executed causes a content directory server (CDS) to be operable with a Universal Plug and Play (UPnP) network, wherein the CDS is configured to
receive a device description from a sink device wherein the device description comprises a media format supported by the sink device,
search header information of a single data structure that encapsulates a media file for one or more media format resources contained in the data structure, wherein the media format resources have a media format that matches the media format supported by the sink device,
if the media format resources do not exist as separate physical files but are virtual resources encapsulated in the data structure, wherein the virtual resources have corresponding media format files that are to be generated from the media file, transmit to the sink device virtual links that reference the media format resources based on the media format supported by the sink device,
if the media format resources exist as separate physical files, transmit to the sink device physical links that reference the physical files based on the one or more media format supported by the sink device,
if one of the media format resources referenced by the virtual links is selected by the sink device, de-multiplex or process the media file to generate a media format file corresponding to the selected media format resource on demand as determined by the media format of the selected media format resource,
if one of the media format resources referenced by the physical links is selected by the sink device, read the physical file corresponding to the selected media format resource as the media format file,
transmit the media format file to the sink device,
wherein the media format resources contained in the single data structure are determined based on media type corresponding to the media file.

2. The apparatus of claim 1, wherein the media format file is de-multiplexed from the media file as determined by the media format of the selected media format resource when the virtual link is selected.

3. The apparatus of claim 1, wherein the media file comprises an image file, the media format file comprises a resolution formats of the image file, and the media format file is scaled from the image file as determined by the resolution format of the selected media format resource when the virtual link is selected.

4. The apparatus of claim 1, wherein the media file comprises a video containing an audio component having an audio encoding format and a video component having a video encoding format, and the CDS is further configured to de-multiplex the audio component and the video component from the video to generate an audio component file having the audio encoding format and a video component file having the video encoding format.

5. The apparatus of claim 4, wherein the audio component file having the audio encoding format is presented as a file referenced by a virtual link.

6. The apparatus of claim 5, wherein the CDS de-multiplexes the audio component from the video to generate the audio component file having the audio encoding format when the virtual link is selected.

7. The apparatus of claim 4, wherein the video component file having the video encoding format is presented as a file referenced by a virtual link.

8. The apparatus of claim 7, wherein the CDS de-multiplexes the video component from the video to generate the video component file having the video encoding format when the virtual link is selected.

9. A method, comprising:
receiving, by a source device, a device description from a sink device wherein the device description comprises one or more media format supported by the sink device;
searching, by the source device, header information of a single data structure that encapsulates a media file for one or more media format resources contained in the data structure, wherein the one or more media format resources have one or more media format matching the one or more media format supported by the sink device;
if the one or more media format resources are found to exist not as separate physical files but as virtual resources encapsulated in the data structure, wherein the virtual resources have corresponding media format files that are to be generated from the media file, transmitting, by the source device, to the sink device virtual links that reference the media format resources based on the one or more media format supported by the sink device;
if the one or more media format resources are found to exist as separate physical files, transmitting, by the source device, to the sink device physical links that reference the physical files based on the one or more media format supported by the sink device;
if one of the media format resources referenced by the virtual links is selected by the sink device, de-multiplexing or processing by the source device the media file to generate a media format file corresponding to the selected media format resource on demand, wherein said de-multiplexing or processing is determined by the media format of the selected media format resource;
if one of the media format resources referenced by the physical links is selected by the sink device, reading by the source device the physical file corresponding to the selected media format resource as the media format file; and
transmitting by the source device the media format file to the sink device,
wherein the one or more media format resources contained in the single data structure are determined based on media type corresponding to the media file.

10. The method of claim 9, wherein said processing the media file comprises scaling the media file to have a different resolution format when a virtual link that references the media format resource having the different resolution format is selected.

11. The method of claim 9, wherein said processing the media file comprises de-multiplexing the media format file from the media file when a virtual link that references the media format resource having the corresponding media format file is selected.

12. The method of claim 9, wherein if one of the media format resources comprises an audio component of a video having an audio encoding format, said processing the media file comprises de-multiplexing the audio component from the video to generate an audio component file having the audio encoding format.

13. The method of claim 9, wherein said receiving a device description from a sink device comprises receiving rendering capabilities of a sink device configured to operate in a Universal Plug and Play (UPnP) network.

14. The method of claim 9, further comprising transmitting and synchronizing a plurality of the media format files to a plurality of sink devices.

15. An apparatus configured to operate with a Universal Plug and Play (UPnP) network, comprising:
an interface configured to receive a device description from a sink device wherein the device description comprises a media format supported by the sink device;
a computer processor configured to
search header information of a single data structure that encapsulates a media file for one or more media resources contained in the data structure, wherein the media resources have a media format that matches the media format supported by the sink device,
if the media resources do not exist as separate physical files but are virtual resources encapsulated in the data structure, wherein the virtual resources have corresponding media format files that are to be generated from the media file, transmit to the sink device virtual links that reference the media resources based on the media format supported by the sink device,
if the media resources exist as separate physical files, transmit to the sink device physical links that reference the physical files based on the one or more media format supported by the sink device,
if one of the media resources referenced by the virtual links is selected by the sink device, de-multiplex or process the media file to generate a media format file corresponding to the selected media resource on demand as determined by the media format of the selected media resource,
if one of the media resources referenced by the physical links is selected by the sink device, read the physical file corresponding to the selected media resource as the media format file,
transmit the media format file to the sink device,
wherein the media resources contained in the single data structure are determined based on media type corresponding to the media file.

16. The apparatus of claim 15, wherein the media resource is de-multiplexed from the media file as determined by the media format of the media resource when the virtual link referencing the media resource is selected by the sink device.

17. The apparatus of claim 15, wherein the media file is a video file and the media resource comprises an audio component of the video file having an audio encoding format, and wherein the audio component is de-multiplexed from the video file to generate the media resource having the audio encoding format.

18. The apparatus of claim 15, wherein the media file is a video file and the media resource comprises a video component of the video file having a video encoding format, and wherein the video component is de-multiplexed from the video file to generate the media resource having the video encoding format.

19. The apparatus of claim 15, wherein the media file comprises an image file and the media resource comprises a resolution format of the image file, and wherein the media resource is scaled from the image file as determined by the resolution format.

20. The apparatus of claim 15, wherein the interface is further configured to transmit the media resource to the sink device.

\* \* \* \* \*